United States Patent [19]

Beyer et al.

[11] Patent Number: 4,882,179

[45] Date of Patent: Nov. 21, 1989

[54] METHOD OF MANUFACTURE OF CREAMY HAVARTI STYLE CHEESE

[75] Inventors: James D. Beyer, Gresham; Mark E. Johnson, Madison, both of Wis.

[73] Assignee: Wisconsin Milk Marketing Board, Madison, Wis.

[21] Appl. No.: 245,335

[22] Filed: Sep. 15, 1988

[51] Int. Cl.$^4$ .............................................. A23C 19/00
[52] U.S. Cl. ........................................ 426/36; 426/582
[58] Field of Search ....................... 426/36, 38, 39, 582

[56] References Cited

U.S. PATENT DOCUMENTS

| | | | |
|---|---|---|---|
| 4,194,011 | 3/1980 | Invernizzi et al. | 426/38 |
| 4,244,972 | 1/1981 | Johnson | 426/38 |
| 4,415,594 | 11/1983 | Czulak et al. | 426/38 |
| 4,534,982 | 8/1985 | Yoshida et al. | 426/38 |

Primary Examiner—Marianne Cintins
Attorney, Agent, or Firm—Peterson, Wicks, Nemer & Kamrath

[57] ABSTRACT

A method of manufacturing a specialty cheese according to the teachings of the present invention is disclosed relating to the manufacture of a creamy Havarti style cheese. According to the present invention, to reduce the moisture content, the curd is cooked at a temperature exceeding the recommended maximum temperature for optimum acid production for a mesophile culture and specifically at a temperature in the range of 104° to 106° F. for a cooking time in the range of one hour for retarding the culture growth to restrict the number of cells to reduce the bitterness in the cheese and for modifying the enzymatic activity of the starter organisms while still achieving acceptable acid production. Further, according to the present invention, the change of balance between the enzymatic activities previously accomplished by chilling the curd with a water bath treatment is accomplished by curing the cheese in a first curing regimen at a temperature in the range of 55° to 65° F. for in the range of 1 to 3 weeks to modify the enzymatic activities to favor the leuconostoc organisms responsible for flavor development and then by curing the cheese in a second curing regimen at a temperature in the range of 40° to 45° F. Elimination of the water bath treatment saves water, water disposal and time, and reduces the risk of product contamination.

18 Claims, No Drawings

METHOD OF MANUFACTURE OF CREAMY HAVARTI STYLE CHEESE

BACKGROUND

The present invention relates generally to cheese manufacture, specifically, to the method of manufacture of a specialty cheese, and particularly to the method of manufacture of creamy Havarti style cheese.

Recently, there has been a heightened enthusiasm by cheesemakers to manufacture different varieties of specialty cheeses. This is in response to an awareness that the desire of consumers for new or different tastes in chesse has been underestimated. This enthusiasm has been tempered by reluctance to manufacture specialty cheeses due to uncertainty of marketing and acceptability by consumers, as well as a lack of manufacturing know-how. Production of specialty cheeses at localized small or medium size cheese factories as opposed to importing such cheeses from a long distance could reduce their cost to the consumer, increase overall cheese sales, and offer another market for milk that is needed to make these cheeses.

Thus, a need exists for methods of manufacturing specialty cheeses which do not involve exotic cultures, which can be easily performed in most existing cheese plants, and which are equally acceptable to consumers of existing specialty cheeses.

SUMMARY

The present invention presents a solution to this need in the field of cheese making by providing, in its most preferred form, a method of manufacture of a creamy Havarti style cheese. Specifically, the method of manufacture of the present invention modifies the enzymatic activities of the organisms of the starter culture to advantageously arrive at a unique, equally consumer acceptable, Havarti style specialty cheese. Particularly, in a first aspect, the curd is cooked at a temperature in the range of 104° to 106° F. for a cooking time in the range of one hour for retarding the culture growth to restrict the number of cells to reduce the bitterness in the cheese and for modifying the enzymatic activity of the starter organisms while still achieving acceptable acid production.

In another aspect of the present invention, the cheese is cured without chilling the curd by water bath treatments of prior Havarti cheese methods by curing the cheese in a first curing regimen at a temperature in the range of 55° to 65° F. for in the range of 1 to 3 weeks to modify the enzymatic activities to favor the leuconostoc organisms responsible for flavor development and then curing the cheese in a second curing regimen at a temperature in the range of 40° to 45° F.

It is thus an object of the present invention to provide a novel method of manufacture of a specialty cheese.

It is further an object of the present invention to provide such a novel specialty cheese manufacture method for creamy Havarti style cheese.

It is further an object of the present invention to provide such a novel specialty cheese manufacture method useful to medium and small size cheese factories.

It is further an object of the present invention to provide such a novel specialty cheese manufacture method for localized production easily accessible to cheese market locations.

It is further an object of the present invention to provide such a novel specialty cheese manufacture method which reduces production time.

It is further an object of the present invention to provide such a novel specialty cheese manufacture method which utilizes standard cheese production facilities.

It is further an object of the present invention to provide such a novel specialty cheese manufacture method resulting in a well liked cheese which has generally equal to or better preference with existing specialty cheeses.

It is further an object of the present invention to provide such a novel specialty cheese manufacture method which reduces the cost to the consumer.

It is further an object of the present invention to provide such a novel specialty cheese manufacture method which increases cheese demand in the existing market location of the cheese factory.

It is further an object of the present invention to provide such a novel specialty cheese manufacture method which reduces cost to the cheese factory.

It is further an object of the present invention to provide such a novel specialty cheese manufacture method which maintains high quality standards.

It is further an object of the present invention to provide such a novel specialty cheese manufacture method not involving exotic cultures.

These and further objects and advantages of the present invention will become clearer in light of the following detailed description of an illustrative embodiment of this invention.

DESCRIPTION

Havarti cheese is a known type of specialty cheese which has had acceptance in numerous worldwide cheese markets. The present invention relates to a method of manufacture of a creamy Havarti style cheese which has an equal or better acceptance than Havarti cheese but which is less expensive and time consuming to manufacture than Havarti cheese. Specifically, the steps of manufacturing a creamy Havarti style cheese according to the preferred teachings of the present invention are as follows:

| Step | Description |
| --- | --- |
| Providing Milk: | Milk is standardized to 5.05% fat with cold separated cream or an approximate casein to fat ratio of .48. The cheese will have a fat on the dry basis of at least .60. Milk is pasteurized after standardization at 163° F./17.5 sec. |
| Adding Culture: | A commercially available mesophile culture (BD-CH-N-01 from Chr. Hansens Lab., Milwaukee, Wisconsin) containing 1 to 5% *Streptococcus lactis*, 75 to 80% *Streptococcus cremoris*, 10 to 15% *Streptococcus lactis* var. *diacetylactis* and 5 to 10% *Leuconostoc cremoris* is grown in heat-treated, 12.5% reconstituted non-fat dry milk at 72° F. for 16 hours (pH 5.0 to 4.6). Higher pH gives milder flavor. Commercial cultures containing only S. cremoris and L. cremoris have also been used. One percent culture is added to the milk at 90° F. The addition of 1.6% starter has been utilized with similar results. |
| Adding Color: | Level and type of color used depends on shade and intensity desired. Ice cream color may be used at a rate of .5 oz. per 1000 lb. milk. Color is added 10 minutes prior to rennet addition and is diluted |

-continued

| Step | Description |
|------|-------------|
| | about 10 fold. |
| Adding Rennet: | Milk is ripened at 90° F. for 40 minutes prior to the addition of rennet. The pH is about 6.50 and the T.A. at about .18. Single strength calf rennet may be used at the rate of 2.3 oz. per 1000 lb. of milk. Less rennet can be used, but more rennet is not recommended. $CaCl_2$ addition may be used to firm the curd. |
| Cutting: | Thirty to thirty-five minutes after rennet addition, the curd is cut with 3/8 inch knives. The curd should be soft at cutting. Cutting the curd soft insures adequate whey expulsion. |
| Healing and Agitating: | The cut curds are allowed to sit for in the range of 10 to 20 minutes and particularly in the range of 10 to 15 minutes before agitation, with the healing times according to the teachings of the present invention being longer than prior healing times of conventional Havarti cheese. Curd firmness is a function of the healing time. The soft curds may shatter if not allowed to heal before agitation. Agitation should be accomplished by stirring gently as excessive fat losses may also result if the cures are agitated too abruptly. |
| Removing Whey: | Thirty minutes after cutting, in the range of 15 to 25% of the original milk volume and particularly in the range of 15% of the original milk volume is removed as whey. Whey removal is approximately one half of the levels of conventional 30 to 40% of the original milk volume in prior Havarti cheese methods. Whey removal reduces lactose concentration which ultimately affects the pH development in the curd. More whey removal will result in less acid flavor. The whey may have an approximate fat level of .5 to .8%. Without whey removal the cheese may have an acid flavor. Care should be taken to prevent shattering of the soft curd. Whey may be removed by setting up a dam at one end while maintaining the agitation in the rest of the vat. As an alternate procedure, whey could be removed once the curd has firmed sufficiently during cooking. Another alternative could be to drain more whey and add less water. |
| Cooking: | Hot water equal to the amount of whey removed having a temperature in the range of 140° F. in the most preferred form is slowly added back to the remaining curd/whey mixture until the cooking temperature in the range of 104 to 106° F. is reached. Steam may have to be added to the vat jacket to heat the whey to the temperature range of 104 to 106° F. The temperature is increased from 90° F. to in the range of 104 to 106° F. over 30 minutes to prevent case hardening of the rather large curd particles. The curd is cooked at the temperature range of 104 to 106° F. for one hour. The curd according to the teachings of the present invention will become much firmer and is easily pumped into hoops without shattering. Lower cook temperatures will increase moisture content of the cheese resulting in pasty cheese. |
| Stirring: | curd is stirred until a pH level of between 6.1 and 6.25 is achieved, which is a slightly lower pH than in second stirrings in conventional Havarti cheese methods. |
| Hooping: | Whey is drained to about curd level and then the curd/whey mixture is pumped into standard brick hoops (6 × 5 × 10 inches). Dry curd could be bucketed into hoops. The whey will have .2 to .3% fat. Cheese will have more and larger openings if more whey is drained before hooping. Draining all the whey is preferred thus permitting the more desirable larger openings in the cheese. The pH of the curd should be in the range of 6.0 to 6.2. |
| Turning: | Once filled, the hoops are turned to prevent uneven openness in the cheese. Turning continues every 20 minutes for the first hour and then once every hour until the curd pH is 5.3 to 5.4 (about 3 to 4 hours after hooping) which is longer than in conventional Havarti cheese methods which have a pH in the range of 5.8 to 6.0. |
| Brining: | The 7 to 10 lb. cheeses are placed in 23% brine at 40 to 45° F. for 1 day. |
| Drying: | Cheeses are allowed to dry (40 to 45° F.) for 2 to 4 days. This step may not be necessary. It is used only as a precaution to prevent brine or whey leakage in the wrapped cheese. If cheeses have developed proper pH at drain and at hooping this step is not necessary. Dry only to get rid of the brine on the outside of the cheese. |
| Curing: | Cheeses are cured at a temperature in the range of 55 to 65° F. for 1 to 3 weeks and preferably at a temperature in the range of 60° F. for 2 weeks. Shorter time in the first curing regimen results in milder flavor while longer time results in stronger flavor. Then, the cheese is cured in a second regimen at 40 to 45° F. until ready for consumption at 8 to 12 weeks. |

The method of cheese manufacture according to the teachings of the present invention has been successfully made in a 5000 lb. capacity, open vat.

The cheese yield equation established from actual productions according to the teachings of the present invention is:

$$\frac{(.91 \, F. + .96 \, C.) \, 1.09}{1-w}$$

F. = fat in milk
C. = casein in milk
.91 = fat recovery
.96 = casein recovery
1.09 = other solids factor
w = decimal of % moisture in cheese.

Efficiency of fat and protein recovery play a critical role in establishing casein to fat ratios in milk necessary to give the desired cheese. Thus, the cheese yield equation which can be used to determine the proper casein to fat ratio may vary between plants. The good fat recovery of the productions according to the teachings of the present invention was the result of using 3/8 inch (9.4 mm) knives instead of 1/4 inch (6.2 mm) knives to cut the curd.

The resulting cheese manufactured according to the teachings of the present invention has a composition of 37 to 38% fat, 36.5 to 37.5% $H_2O$, 1.5 to 1.7% salt, pH at 4 days 5.1 to 5.2, and fat in the dry matter of 0.60 to 0.61. Yield is approximately 12 lb. per 100 lb. of milk. Although the cheese may appear firm initially, by 8 weeks the body will have softened. Inadequate whey expulsion and whey drainage may result in higher moisture cheeses which may be excessively soft and pasty and not easily sliced, and which may tend to have a whey taint flavor.

Descriptive and consumer preference panels run on cheese manufactured according to the teachings of the present invention and Danish Havarti cheese found direct comparison of several attributes, with the body of the cheese manufactured according to the teachings of the present invention being firmer than Danish Havarti cheese. Both cheeses were well liked, with the mean scores of preferences not being significantly different. However, it can be appreciated that cheese manufactured according to the teachings of the present invention is not an exact copy of existing Havarti cheese, but rather is a unique specialty cheese which is acceptable to consumers and which is believed to be advantageous thereover.

Specifically, it can be appreciated that higher cooking temperatures, longer cooking times, and a two temperature curing regimen are utilized according to the teachings of the present invention. Specifically, against conventional wisdom of cooking at a temperature of 101° to 102° C. and not approaching or exceeding the recommended maximum temperature for optimum acid production by mesophile cultures at which ranges the culture organisms are adversely affected by heat stress, the method of the present invention utilizes a cooking temperature in the range of 104° to 106° F. and preferably in the range of 104° to 105° F. Although culture growth is inhibited and enzymatic activities of the organisms of the starter culture are modified, acceptable acid production is obtained. The retarded growth is believed to result in less bitterness in the cheese because a greater number of cells have been associated with bitter cheese. Thus, it can be appreciated that the method of manufacture utilizes the higher cooking temperature and cooking times for arriving at final moisture content and pH of an advantageous cheese having the characteristics set forth according to the teachings of the present invention.

It should also be appreciated that the higher cooking temperatures and the longer cooking times according to the teachings of the present invention are advantageous over other methods of moisture reduction. Specifically, reduction in curd size also generally reduces moisture. However, smaller sized curd increases surface areas and thus exposes more fat to the whey. At temperatures above the melting point of fat, fat would not be held by the curd matrix and would be lost to the whey. Thus, the possibility of high fat loss from the reduction in curd size to achieve the desired moisture content is avoided by the method of manufacture of the present invention.

It is further believed that the higher initial curing temperature favors the leuconostoc organisms responsible for the desired flavor development during cure over the cremoris and lactis organisms. The higher initial curing temperature achieves the desired change of balance between the enzymatic activities rather than utilizing prior water bath treatments for chilling the curd after cooking and prior to bringing. Elimination of the prior chilling step saves water, water disposal and time and reduces the risk of product contamination.

Now that the basic teachings of the present invention have been explained, many extensions and variations will be obvious to one having ordinary skill in the art. For example, the conditions and procedures of manufacture may deviate from the steps set forth with any given cheese factory, with a variety of manufacturing methods typically being available to produce a similar cheese. However, it is believed that the method according to the present invention is particularly advantageous.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In a method of manufacture of a Havarti cheese comprising the steps of: providing standardized and pasteurized milk; adding mesophilic culture comprising organisms having enzymatic activity; ripening the milk and adding rennet to form a curd; cutting the curd; healing the curd; stirring the curd; removing a volume of whey; adding hot water equal to the volume of whey remove and cooking the curd for a cooking time; second stirring the curd; hooping the curd; turning the hoops; and brining and curing the cheese, with the improvement comprising cooking the curd at a temperature in the range of 104° to 106° F. for a cooking time of about one hour for retarding the culture growth, to restrict the number of the cells, to reduce the bitterness in the cheese and for modifying the enzymatic activity of the organisms while still achieving acid production.

2. The cheese manufacture method of claim 1 wherein the step of cutting the curd comprises the step of cutting the curd with $\frac{3}{8}$ inch knives.

3. The cheese manufacture method of claim 2 wherein the step of healing the curd comprises the step of healing the curd in the range of 10 to 20 minutes before the step of stirring the curd.

4. The cheese manufacture method of claim 3 wherein the step of healing the curd comprises the step of healing the curd in the range of 10 to 15 minutes before the step of stirring the curd.

5. The cheese manufacture method of claim 3 wherein the step of removing a volume of whey comprises the step of removing in the range of 15 to 25% of the original milk volume as whey.

6. The cheese manufacture method of claim 5 wherein the step of removing a volume of whey comprises the step of removing about 15% of the original milk volume as whey.

7. The cheese manufacture method of claim 5 wherein the step of second stirring the curd comprises the step of stirring the curd until a pH level in the range of 6.1 to 6.25 is achieved.

8. The cheese manufacture method of claim 7 wherein the step of turning the hoops comprises the step of turning the hoops until a pH level in the range of 5.3 to 5.4 is achieved.

9. The cheese manufacture method of claim 8 wherein the mesophilic culture comprises leuconostoc organisms; and the step of brining and curing the cheese comprises the step of: brining the cheese; and curing the cheese in a first curing regimen at a temperature in the range of 55° to 65° F. for in the range of 1 to 3 weeks to modify the enzymatic activities to favor the leuconostoc organisms responsible for flavor development without chilling the curd by water bath treatments of prior Havarti cheese methods and curing the cheese in a second curing regimen at a temperature in the range of 40° to 45° F.

10. The cheese manufacture and method of claim 9 wherein the step of curing the cheese in a first curing regimen comprises the step of curing the cheese in a first curing regimen at a temperature of about 60° F. for about 2 weeks.

11. The cheese manufacture method of claim 10 wherein the step of curing the cheese in a second curing regimen comprises the step of curing the cheese in a second curing regimen for in the range of 8 to 12 weeks.

12. The cheese manufacture method of claim 1 wherein the mesophilic culture comprises leuconostoc organisms; and the step of brining and curing the cheese comprises the steps of: brining the cheese; and curing the cheese in a first curing regimen at a temperature in the range of 55° to 65° F. for in the range of 1 to 3 weeks to modify the enzymatic activities to favor the leuconostoc organisms responsible for flavor development without chilling the curd by water bath treatments of prior Havarti cheese methods and curing the cheese in a second curing regimen at a temperature in the range of 40° to 45° F.

13. The cheese manufacture method of claim 12 wherein the step of curing the cheese in a first curing regimen comprises the step of curing the cheese in a first curing regimen at a temperature of about 60° F. for about 2 weeks.

14. The cheese manufacture method of claim 13 wherein the step of curing the cheese in a second curing regimen comprises the step of curing the cheese in a second curing regimen for in the range of 8 to 12 weeks.

15. The cheese manufacture method of claim 12 wherein the step of removing a volume of whey comprises the step of removing in the range of 15 to 25% of the original milk volume as whey.

16. The cheese manufacture method of claim 15 wherein the step of turning the hoops comprises the step of turning the hoops until a pH level in the range of 5.3 to 5.4 is achieved.

17. The cheese manufacture method of claim 1 wherein the step of removing a volume of whey comprises the step of removing in the range of 15 to 25% of the original milk volume as whey.

18. The cheese manufacture method of claim 17 wherein the step of turning the hoops comprises the step of turning the hoops until a pH level in the range of 5.3 to 5.4 is achieved.

* * * * *

UNITED STATES PATENT OFFICE
CERTIFICATE OF CORRECTION

Page 1 of 2

Patent No. 4,882,179                     Dated November 21, 1989

Inventor(s) James D. Beyer and Mark E. Johnson

It is certified that error appears in the above-identified patent and that said Letters Patent is hereby corrected as shown below:

On the title page, under the heading "References Cited", insert
--OTHER REFERENCES "Cheese" by J.G. Davis, Vol. III, Manufacturing Methods, Elsevier, pages 782 and 783

Journal of Dairy Research, "Effect of ultrafiltered milk and use of different starters on the manufacture, fermentation and ripening of Havarti cheese" by K.B. Qvist, D. Thomsen and E. Hoier, 1987, 54, pages 437-446

"Handbuch der Käse, Käse der Welt von A-Z, Eine Enzyklopadie" by Dr. Heinrich Mair-Waldburg, 1974, page 505 and translation "Production of Creamy Havarti Style Cheese", a handout given out by Chris Hansen Laboratory on July 6 to August 12, 1988

New Zealand Journal of Dairy Science and Technology, "Uncoupling of Growth and Acid Production in Lactic Streptococci" by K.W. Turner and T.D. Thomas, 1975, pages 162-167.

"Advances in the Microbiology and Biochemistry of Cheese and Fermented Milk" by F. Lyndon Davies and Barry A. Law, pages 92-95.--.

UNITED STATES PATENT OFFICE
CERTIFICATE OF CORRECTION

Patent No. 4,882,179                    Dated November 21, 1989

Inventor(s) James D. Beyer and Mark E. Johnson

It is certified that error appears in the above-identified patent and that said Letters Patent is hereby corrected as shown below:

Column 3, line 58, before "curd", insert --The--.

Column 4, line 36, remove the portions of the line extending beyond the equation such that the equation is in a fraction format.

Column, 6, line 10, after "adding" insert --a--.

Column 6, line 15, cancel "remove" and substitute therefore --removed--.

Column 6, line 55, cancel "step" and substitute therefore --steps--.

Column 6, line 64, cancel "and".

Signed and Sealed this

Twenty-second Day of January, 1991

Attest:

HARRY F. MANBECK, JR.

*Attesting Officer*      *Commissioner of Patents and Trademarks*